(12) United States Patent
Koga et al.

(10) Patent No.: US 6,678,684 B1
(45) Date of Patent: Jan. 13, 2004

(54) WORLDWIDE EARLY WARNING NETWORK AND METHOD OF USE

(76) Inventors: Makio Koga, 4F Kanda-Tochitatemono-Ichibancho, Bldg.22, Ichibancho, Chiyodaku, Tokyo (JP), 102-0082; Takaaki Kamei, 2-7-19, Hiroo, Shibuyaku, Tokyo (JP), 150-0012

( * ) Notice: Subject to any disclaimer, the term of this patent is extended or adjusted under 35 U.S.C. 154(b) by 0 days.

(21) Appl. No.: 09/610,578

(22) Filed: Jul. 5, 2000

Related U.S. Application Data

(60) Provisional application No. 60/173,833, filed on Dec. 30, 1999.

(51) Int. Cl.⁷ .............................................. G06F 17/30
(52) U.S. Cl. .............................. 707/10; 707/7; 707/202; 709/106
(58) Field of Search .......................... 707/1, 10, 3, 100, 707/200, 202, 204, 104.1, 103, 7; 705/14; 345/18, 835; 358/453; 714/4; 709/106, 225, 200, 234

(56) References Cited

U.S. PATENT DOCUMENTS

| | | | |
|---|---|---|---|
| 5,717,923 A | 2/1998 | Dedrick ........................ | 705/10 |
| 5,740,549 A | 4/1998 | Reilly et al. .................. | 705/14 |
| 5,752,238 A | 5/1998 | Dedrick ........................ | 705/14 |
| 5,754,939 A | 5/1998 | Herz et al. ................... | 455/3.04 |
| 5,802,518 A | 9/1998 | Karaev et al. ................ | 707/10 |
| 5,813,007 A | 9/1998 | Nielsen ........................ | 707/11 |
| 5,813,009 A * | 9/1998 | Johnson et al. .............. | 707/100 |
| 5,819,032 A | 10/1998 | de Vries et al. ............. | 345/835 |
| 5,819,284 A | 10/1998 | Farber et al. ................ | 707/10 |
| 5,835,923 A | 11/1998 | Shibata et al. .............. | 358/453 |
| 5,845,262 A | 12/1998 | Nozue et al. ................. | 705/26 |
| 5,850,520 A | 12/1998 | Griebenow et al. ......... | 709/206 |
| 5,893,091 A | 4/1999 | Hunt et al. ................... | 707/10 |
| 5,991,799 A | 11/1999 | Yen et al. ..................... | 345/18 |
| 6,332,120 B1 * | 12/2001 | Warren ......................... | 704/235 |

* cited by examiner

*Primary Examiner*—Charles Rones
*Assistant Examiner*—Hassan Mahmoudi
(74) *Attorney, Agent, or Firm*—Brown & Michaels, PC

(57) ABSTRACT

A method for determining appropriate measures for catastrophic events comprises the steps of programming a computer to continuously scan electronic news media reports for at least one of a selected group of key words, and upon finding such key words, selecting at least one of the news media reports when at least one of the key words is found. The invention further provides for scanning the one of the news media reports for at least one of a selected group of key phrases so as to determine a location, nature and extent of a catastrophic event corresponding to the at least one of the selected group of key words and then selecting an initial reaction from a table of reactions corresponding to the determined location, nature and extent of the events, whereupon the invention publishes the recommended initial reaction. The method then calls for continuing the scanning of the news media reports for further developments and changes in the location, nature and extent of the event and selecting a further reaction from the table of reactions for publishing. This process continues until a currently determined one of the further reactions differs from an immediately past one of the further reactions by less than a predetermined degree, that is, when the catastrophe is under control. Further steps are taken to provide automated analysis and strategy building procedures so that a company subscriber may know if more or possibly less production is required in order to meet the needs of the crises.

4 Claims, No Drawings

WORLDWIDE EARLY WARNING NETWORK AND METHOD OF USE

For purposes of establishing an earlier date of conception or priority date in the present application, a previously filed Provisional Patent Application having serial No. 60/173,833 and an assigned filing date of Dec. 30, 1999 and which contains subject matter substantially the same as that described and claimed in the present application is herein identified.

BACKGROUND OF THE INVENTION

1. Field of the Invention

This invention relates generally to methods for warning of disasters and such, and more particularly to an early warning method with prediction of outcomes and consequences of a disaster.

2. Description of Related Art

In recent years, in the wake of a series of corporate scandals, the eyes of the world have keenly fastened on the business community. In addition to the issue of corporate ethics, controversy over corporate governance and the nature of business' public-spiritedness has been raised. It can be said that the companies are now expected, even required, to have resolve and a firm attitude as a social unit in this era. The basic idea is the realization of business open to society, that is, the pursuit of "fairness" and "openness" (disclosure, transparency). In other words, business performance should provide a new value to the society by fair means and contribute to the establishment of an affluent society as well as the establishment of a mechanism for self-purification in order to render a healthful influence on the society. Regarding the latter especially, the positive attitude can be seen from the fact that 80% of large companies in western countries have established what may be called a corporate security section, with a full-time director holding a position of Risk Control Manager, or the equivalent.

Large companies are seriously recasting the role of corporate security for assuming tasks beyond those of the conventional legal affairs section. Additionally institution of a new position of Crisis Control Manager has been carried out by many companies. Especially multinational enterprises doing business through subsidiaries or related companies worldwide, therefore, must take measures of for corporate security in order to structure and maintain a good relationship with society, and more than anything else, to protect human life, property and corporate image. The present invention is a worldwide early warning system developed to take the earliest appropriate measures when crises occur by paying considerable attention to what is happening in society.

Both natural and man-made disasters seem to be happening at an alarming rate and with the growth in worldwide population, response time is much too slow using current measures. The use of high speed computers to search available database information quickly makes the present invention practical. Such search information along with information about the infrastructure of society, historical comparisons and statistical methods can enable significant improvements in reaction time. For example, should a fire occur in a chemical plant, if news of the fire is known on a timely basis as well as the nature of the chemical substances typically present in the plant, it may be possible to provide a considerable advantage in both reaction time as well as fire fighting strategy. Considerable waste of time and life can be avoided.

The following art defines the present state of this field:

Dedrick, U.S. Pat. No. 5,717,923 describes a method and apparatus for dynamically customizing electronic information to individual end users including a client system containing a personal profile database which stores consumer information corresponding to individual end user(s) of the client system. The client system also includes a content adapter which compares electronic information received by the client system to the consumer information in the personal profile database and customizes the electronic information to an individual end user based on this comparison. The client system also includes a client activity monitor which monitors actions taken by an individual end user when consuming electronic information and updates the personal profile database based on these actions. In one embodiment, the client activity monitor also monitors which actions are ignored by the individual end user and updates the personal profile database based on the consumer's interaction with the electronic information (that is, both the consumer's action and inaction). In one embodiment, an electronic information server containing a plurality of electronic information units is coupled to the client system via an electronic information distribution network and serves as the source of the electronic information.

Applicant further disclosed in the Background section: Reilly et al., U.S. Pat. No. 5,740,549 describes an information and advertising distribution system. A data server stores and updates a database of information items and advertisements. The information items and advertisements are each categorized so that each has an associated information category. Workstations remotely located from the data server each include a display device, a communication interface for receiving at least a subset of the information items and advertisements in the data server's database and local memory for storing the information items and advertisements received from the data server. An information administrator in each workstation establishes communication with the data server from time to time so as to update the information items and advertisements stored in local memory with at least a subset of the information items and advertisements stored by the data server. An information display controller in each workstation displays on the workstation's display device at least a subset of the information items and advertisements stored in local memory when the workstation meets predefined idleness criteria. At least a subset of the workstations includes a profiler for storing subscriber profile data. The subscriber profile data represents subscriber information viewing preferences, indicating information categories for which the subscriber does and does not want to view information items. The information display controller includes a filter for excluding from the information items displayed on the display device those information items inconsistent with the subscriber profile data.

Dedrick, U.S. Pat. No. 5,752,238 describes a consumer-driven electronic information pricing mechanism including a pricing modulator and pricing interface is contained within a client system. The pricing modulator contains multiple pricing options for electronic content and multiple content to advertisement ratios associated with the pricing options. The pricing interface is coupled to the pricing modulator and provides an end user with the pricing options and associated content to advertisement ratios, and also accepts pricing option selections from the end user. In one embodiment, a metering server is coupled to the client system. The metering server contains the multiple pricing options which are to be made available to the end user and transfers these pricing options to the client system. In one embodiment, the pricing interface can be accessed by the end user at any time during the operation of the client system. The end user can change the pricing option during system operation.

Herz et al., U.S. Pat. No. 5,754,939 describes a customized electronic identification of desirable objects, such as news articles, in an electronic media environment, and in particular to a system that automatically constructs both a "target profile" for each target object in the electronic media based, for example, on the frequency with which each word appears in an article relative to its overall frequency of use in all articles, as well as a "target profile interest summary" for each user, which target profile interest summary describes the user's interest level in various types of target objects. The system then evaluates the target profiles against the users' target profile interest summaries to generate a user-customized rank ordered listing of target objects most likely to be of interest to each user so that the user can select from among these potentially relevant target objects, which were automatically selected by this system from the plethora of target objects that are profiled on the electronic media. Users' target profile interest summaries can be used to efficiently organize the distribution of information in a large scale system consisting of many users interconnected by means of a communication network. Additionally, a cryptographically-based pseudonym proxy server is provided to ensure the privacy of a user's target profile interest summary, by giving the user control over the ability of third parties to access this summary and to identify or contact the user.

Karaev et al., U.S. Pat. No. 5,802,518 describes the secure electronic distribution of research documents over the world wide web to investors who are authorized to receive said research documents. A repository server receives research documents from contributors. Also received are corresponding document profiles with information relating to each research document including authorization information specifying who is permitted to access each research document. The repository server includes a first database for structured query searches and a second database for full text searches. A web server is coupled to the repository server and coupled to the world wide web. The web server receives requests from investors for research documents that satisfy a query. The web server determines whether the first database or the second database should be searched based upon the type of query. The repository server transmits to the web server a list of research documents that satisfy the query and which the investor is authorized to access according to the authorization information. The web server formats the list of documents according to a template form. Optionally, queries can be optimized. The system has a control mechanism to prevent concurrent unauthorized access by two people using the same ID/password combination.

Nielsen, U.S. Pat. No. 5,813,007 describes apparatus, methods, systems and computer program products having automatic notification of sufficient changes in bookmarked information files. The invention provides a user of information access programs (such as WWW Browsers) to automatically be informed of changes in information files (such as WWW Web Pages) when the maintainer of the information file determines that a sufficient change has been made to the file.

De Vries et al., U.S. Pat. No. 5,819,032 describes an electronic magazine that is distributed electronically over a network (e.g., Internet) from a publisher to multiple subscribers. In an initial timeline navigation screen depicted on the subscriber's computer display, articles are graphically represented in a graphical user interface as article boxes overlaid on a background. A marker is added to the article boxes to indicate that comments to the underlying article have been published as part of the magazine. To view the various comments for a particular article, the subscriber activates the article box to launch a second screen which includes the selected article box positioned prominently, and one or more graphical comment boxes indicative of the commentaries surrounding the article box. This second screen thereby provides a message thread of articles and related commentaries. An alternative approach to building a message thread is to launch a pop-up graphical list window from activation of the selected article which lists related commentaries. To submit a commentary on an article, the subscriber locates a file containing a previously drafted comment and drags a file icon representing the comment file to a submission target on the magazine's graphical user interface. The subscriber drops the file icon on the submission target which causes the computer to automatically send the comment file, along with identification of the article to which the comment relates, over the network to the publisher. The publisher can then review the commentary and at their discretion, add the commentary to the magazine or discard it. A time line showing the temporal relationship of when articles and commentaries are published within a publishing period is also provided as part of the graphical user interface. As an indicator is moved along the time line, the graphical article boxes are added to or removed from the screen to demonstrate which articles were published at which times within the publishing period.

Farber et al., U.S. Pat. No. 5,819,284 describes system where information "feeds" received from multiple information sources are aggregated, re-formatted and stored in a personalized real time information display system. When the display system receives a request from a user having a personal computer or other similar display device, the system is arranged to respond with information needed to display a screen saver that includes personalized, up to date information, such as traffic, weather and sports, that is of interest to that particular user. Each user has a personalized user profile indicating (a) the categories or types of information that the user desires to receive, such as sports information, weather, investment advisories, and so on, and (b) parameters that specify, for that user, the exact information desired to be received in each category. If the user's personal computer display has remained inactive for a predetermined period of time, the screen saver is activated, causing the personal computer to access the service node, and after interchange of prestored user identification and password data, retrieve information, obtained by the system from a variety of sources, based on the user's individual profile. The retrieved information is displayed on the screen without interrupting the screen saver function, and the displayed personalized data is thereafter updated in the same manner, at user-specified time intervals.

Shibata et al., U.S. Pat. No. 5,835,923 describes publication articles each composed of a headline having relatively high information emphaticality and a text having relatively high information detailedness that are coded on an article basis in an information provider apparatus. The coded information is transmitted to a user terminal. The transmitted information is first displayed on a display device of the user terminal in low magnification to display the headlines. The user selects a desired headline. The text corresponding to the selected headline is displayed in a magnification sufficient for making the displayed text legible. The novel setup realizes a publication contents information transmitting/ viewing system by which a publication page can be viewed over and each can be read in generally the similar feeling and convenience as those of paper-based publications.

Nozue et al., U.S. Pat. No. 5,845,262 describes a system for mainly transferring various information of a newspaper, a magazine, an advertisement, and the like by dot data. Data information provided from a newspaper company, publishing companies, and the like is converted into electronic press information via an electronic press producer 20. The electronic press information is dispatched from a center to an information vending machine through a satellite line or a terrestrial line. Dispatched press data is once accumulated to a recording unit in the information vending machine. When it is identified that an information fee has been paid by cash or a prepaid card, desired data in the information accumulated in the recording unit is written into a recording medium such as an IC card or the like of a consumer.

Griebenow et al., U.S. Pat. No. 5,850,520 describes a method and system for distributing an electronic publication. The invention allows the distribution of customized publications, including customized advertising, customized content, or both. In accordance with the method for distributing an electronic publication, a version of an electronic publication is retrieved from storage. The electronic publication is delivered to the consumer by electronically sending the electronic publication to the consumer's electronic mail address with a return receipt requested. A receipt is then generated in response to the retrieval of the electronic publication from the consumer's electronic mailbox.

Hunt et al., U.S. Pat. No. 5,893,091 describes a method for distributing timely information over a computer network where a Timely Information Server collects and organizes information from Timely Information Providers and then broadcasts the organized information to endusers in the form of an alerts over a plurality of alert channels. The alert is comprised of keywords and arguments, wherein the keywords describe the subject matter of the alert and the arguments provide content of the alert. The Timely Information Server maintains a dictionary of all possible keywords and the endusers copy a portion of the dictionary to their local computers to create individual keyword profiles which are comprised of keywords and Boolean operators. When an alert satisfies a Boolean equation in a users keyword profile the headline of the alert (stored as an argument) is displayed and the user is given the option to link his/her web browser to an associated URL (also stored as an argument).

Yen et al., U.S. Pat. No. 5,991,799 describes a method and system for receiving incoming information from multiple information sources, both interactive and passive, and for engagingly presenting that information to a recipient on a presentation interface. The system includes a "background" element, which interacts with interactive information sources and receives from passive information sources, and determines whether information from those sources is likely to be interesting to the recipient, possibly using one information source to determine priority for another. The system also includes a "foreground" element, which presents information to the recipient when active, but not when inactive. The background is operative even when the foreground element is inactive, and when the background detects new information of interest to the recipient (for example, exceeding a selected threshold of interest or satisfying a selected criterion for interest), it causes the foreground to become active and engage the recipient to select and view that new information. The threshold or criterion may be adaptively responsive to recipient preferences, whether explicitly expressed or implied, but may also be relatively fixed, such as a scheduled time of day.

The prior art teaches the use of media scanning and information collection. However, the prior art does not teach a method of combining media scanning with large scale database searching for relevant infrastructure information to take predetermined actions. The present invention fulfills these needs and provides further related advantages as described in the following summary.

SUMMARY OF THE INVENTION

The present invention teaches certain benefits in construction and use which give rise to the objectives described below.

The present invention combines vigilance for early warning with known risk factors. The sooner and more appropriate the reaction is, the more likely the loss, from any disaster can be minimized. An appropriate goal is to provide full reaction to any large scale disaster within 24 hours. This is attainable through the instant method and system which scans all available media to obtain catastrophic information as a catastrophe occurs or is the formation. The end product of the use of the instant invention is the generation of an action report with recommendations as to alternative actions now with corresponding estimates for success.

A primary objective of the present invention is to provide a catastrophe reaction system having advantages not taught by the prior art.

Another objective is to provide such a system with self-contained diagnostic and prognosis capability.

A further objective is to provide such a system enabled to achieve results in the shortest time possible.

Other features and advantages of the present invention will become apparent from the following more detailed description, taken in conjunction with the accompanying drawings, which illustrate, by way of example, the principles of the invention.

DETAILED DESCRIPTION OF THE INVENTION

The invention is a method for determining appropriate measures for catastrophic events and comprises the steps of programming a computer to continuously scan electronic news media reports for at least one of a selected group of key words, and upon finding such key words, selecting at least one of the news media reports when at least one of the key words is found. The invention further provides for scanning the one of the news media reports for at least one of a selected group of key phrases so as to determine a location, nature and extent of a catastrophic event corresponding to the at least one of the selected group of key words and then selecting an initial reaction from a table of reactions corresponding to the determined location, nature and extent of the events, whereupon the invention publishes the recommended initial reaction. The method then calls for continuing the scanning of the news media reports for further developments and changes in the location, nature and extent of the event and selecting a further reaction from the table of reactions for publishing. This process continues until a currently determined one of the further reactions differs from an immediately past one of the further reactions by less than a predetermined degree, that is, when the catastrophe is under control.

To enable this invention for one of skill in the art the following description with particular examples is provided.

In a first example, we shall assume that a Caribbean hurricane is forming in the mid-Atlantic ocean. News bulletins would be broadcast by the major relevant weather tracking stations in the area. These early transmissions might be received by a radio receiver, a part of the present invention, and a word recognition computer program might then transcribe the reception into text for the text scanner of the invention to translate, as described above. Also, as is well known in the art, the news services place written news bulletins on international electronic news channels such as the Internet, and these are available for scanning using well known text scanning techniques which, using well known word recognition techniques is able to spot words of choice. Now the computer program of the invention has stored in a database of any well known type, a selection of key words, such as hurricane, earthquake, bomb blast, bombing, tornado, typhoon, fire, explosion and so on. When the scanning process spots one or more of these key words, it marks the column or article for further review. During the further review, which is a more critical review the program seeks a match to a stored set of key phrases in the database. Such phrases might consist of word strings like, "23 people killed," "23 people feared missing," "100 million dollars in property damage," "near Hilton Head Island," "tomorrow night," "7.3 on the Richter scale" and so on. An extensive look-up table is provided so that these phrases may be associated with a prescribed reaction.

For instance, if a bulletin contains the word "earthquake" the program set starts to look for the word "Richter." When it is found, the program looks for a printed number or numeral so as to ascertain the size of the quake. The program may have a rule to ignore any quake smaller than 3.2 on the Richter scale unless it is centered in a metropolitan area, as an example of programmed exclusions. If the quake is, greater than Richter 5.0 and within certain predefined geographical defined areas, the program continues to scan to obtain an estimate of property damage and loss of life being careful to find associated key words such as "estimate" and "confirmed" or "reported."

Once the program has established a location, type of disaster and order of magnitude, it moves to an "appropriate reaction" table. Having looked up the appropriate reaction in the table, it then publishes the result, which in the instant invention means, to email warnings to subscribers of the service or transmitting over open wire or private wire to selected companies as written messages or directly to software servers using the well known ERP (enterprise resource planning) and CRM (customer relation management) and CMS (contents management system) and POS (product operation system) which obtains business process failure information and customer relation influences and effects information respectively. All information goes through a mail server, web server and the final output is an alert and countermeasures strategy. Top management is therefore alerted to conditions and their potential effects on the businesses, as worthy events occur worldwide. Such a warning may take the form of "Warning, a major tropical storm 300 miles South East of Cuba will make landfall directly in the Miami, Fla. area by Wednesday night. Due to its size and speed, it is expected that the ocean will be 28 feet above normal tide levels so that it is desired to move all residents within 20 miles of the coast inland. It is expected that food and fresh water will be in short supply in the area by up to 50%." The scanning and analysis steps are continued until the reports indicate that all hazards are over or are well in hand. Corporate management is alerted and also is informed as to what to do by virtue of corporate plans, as for instance through a computer system link to SCM (supply chain management) programs. Such a link will tell management how many of certain products must be manufactured within a specified period of time.

In a further embodiment of the present inventive method the step of preparing an expected danger estimate table is taken and then a specific expected danger estimate is selected from this table once the magnitude of the disaster is estimated or revealed. Such a table may be prepared using historical data, as for instance in the example of south Atlantic hurricanes. Such historical data is also available for floods of certain rivers, earthquakes along certain fault lines, and also for tornadoes in certain areas of the world. Also, statistical inference, and other stochastic techniques may be applied once a baseline of initial information has been established.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. A method for determining appropriate measures for catastrophic events comprising the steps of:
   a) programming a computer to continuously scan electronic news media reports for at least one of a selected group of key words;
   b) selecting at least one of the news media reports when at least one of the key words is found in the one of the news media reports;
   c) scanning the at least one of the news media reports for at least one of a selected group of key phrases so as to determine a location, nature and extent of a catastrophic event corresponding to the at least one of the selected group of key words;
   d) selecting an initial reaction from a table of reactions corresponding to the determined location, nature and extent of the event;
   e) publishing the recommended initial reaction;
   f) continuing scanning of the news media reports for further developments and changes in the location, nature and extent of the event;
   g) selecting a further reaction from the table of reactions;
   h) publishing the further reaction; and
   i) repeating steps (f), (g) and (h) until a currently determined one of the further reactions differs from an immediately past one of the further reactions by less than a predetermined degree.

2. The method of claim 1 further including the step of transmitting the reaction and further reaction directly to corporate management computer records for automated analysis and strategy production.

3. A method for determining appropriate measures for catastrophic events comprising the steps of:
   a) programming a computer to continuously scan electronic news media reports for at least one of a selected group of key words;
   b) selecting at least one of the news media reports when at least one of the key words is found in the one of the news media reports;
   c) scanning the at least one of the news media reports for at least one of a selected group of key phrases so as to determine a location, nature and extent of a catastrophic event corresponding to the at least one of the selected group of key words;

d) selecting an expected danger estimate from a table of condition-danger pairs;

e) selecting an initial reaction from a table of danger-reaction pairs corresponding to the determined location, nature and extent of the event and the expected danger from step (d);

f) publishing the recommended initial reaction;

g) continuing scanning of the news media reports for further developments and changes in the location, nature and extent of the event;

h) selecting a further reaction from the table of reactions;

i) publishing the further reaction; and j) repeating steps (g), (h) and (i) until a currently determined one of the further reactions differs from an immediately past one of the further reactions by less than a predetermined degree.

4. The method of claim 3 further including the step of transmitting the reaction and further reaction directly to corporate management computer records for automated analysis and strategy production.

* * * * *